United States Patent
Chertov et al.

(10) Patent No.: US 11,973,660 B1
(45) Date of Patent: Apr. 30, 2024

(54) METHOD AND SYSTEM FOR DATA MODEL MAPPING FOR NETWORK MANAGEMENT

(71) Applicant: Arista Networks, Inc., Santa Clara, CA (US)

(72) Inventors: Roman Olegovich Chertov, San Jose, CA (US); Sebastian Sapa, Vancouver (CA); Allan Drew Clarke, Austin, TX (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 18/078,706

(22) Filed: Dec. 9, 2022

(51) Int. Cl.
*G06F 15/177* (2006.01)
*H04L 41/0816* (2022.01)
*H04L 41/14* (2022.01)

(52) U.S. Cl.
CPC ........ *H04L 41/145* (2013.01); *H04L 41/0816* (2013.01)

(58) Field of Classification Search
CPC ............................ H04L 41/145; H04L 41/0816
USPC .................................................. 709/220, 223
See application file for complete search history.

(56) References Cited

U.S. PATENT DOCUMENTS

| | | | | |
|---|---|---|---|---|
| 11,537,448 | B1* | 12/2022 | Chari | G06F 9/54 |
| 2010/0162205 | A1* | 6/2010 | Clemm | H04L 41/0213 |
| | | | | 717/106 |
| 2012/0095973 | A1* | 4/2012 | Kehoe | G06F 8/70 |
| | | | | 707/694 |
| 2017/0187577 | A1* | 6/2017 | Nevrekar | H04L 41/0226 |
| 2017/0339002 | A1* | 11/2017 | Sigoure | H04L 41/0895 |
| 2022/0329489 | A1* | 10/2022 | Nayyar | H04L 41/0893 |
| 2023/0185639 | A1* | 6/2023 | Chari | G06F 16/86 |
| | | | | 719/328 |

FOREIGN PATENT DOCUMENTS

| | | | | |
|---|---|---|---|---|
| CN | 101046810 A | * | 10/2007 | ....... G06F 17/30595 |
| CN | 103488640 A | * | 1/2014 | .......... G06F 11/3037 |
| CN | 114138748 A | * | 3/2022 | |

* cited by examiner

Primary Examiner — Liang A Wang
(74) Attorney, Agent, or Firm — Sprinkle IP Law Group (57) ABSTRACT

Systems and methods for the dynamic mapping of network element data between data models in network devices are disclosed. In particular, a marked-up native data model can be processed to create a mapping schema file based on the markup included in the native data model. This mapping schema file may define mappings between elements of the native data model and corresponding elements of an external data model. The mapping schema file can then be used to dynamically map network element data from the native data model to the external data model, such as when responding to requests for network element data associated with the mapped elements.

19 Claims, 4 Drawing Sheets

METHOD AND SYSTEM FOR DATA MODEL MAPPING FOR NETWORK MANAGEMENT

BACKGROUND

Models are often employed in the implementation and management of network devices (e.g., hardware or software utilized in a network, collectively referred to as network devices or elements interchangeably). These models are structured representations of those network devices and their associated configured or operational state or administrative actions, and are usually described in a data modeling language such as YANG (Yet Another Next Generation). This modeling allows for the consistent and structured representation of devices or protocol attributes. Such model definitions typically include the (e.g., low level) data types used to represent configurational states or operational attributes, as well as constraints that should be enforced during configuration. By using these types of modeled representations a consistent mechanism for device configuration, as well as the validation of the device state through streaming telemetry or other device interrogation methods, can be provided. These modeled device representations can also be transformed into data structures that can be used by network devices or network management systems to dynamically control device configuration or state.

Accordingly, models may be used both by providers (e.g., manufacturers or vendors) of network devices and users of those network devices that desire to configure those network devices or monitor network devices in operation (e.g., users that utilize such network devices in their network, administrators of such networks, etc.). Specifically, providers of these network devices may utilize data models internally to implement internal operations of the network devices, such as configuration or management (e.g., monitoring, administration, etc.) of their devices or other operations. Similarly, external (e.g., to a network device) data models may be employed by users of those network devices (e.g., entities that employ network devices to provide a network) or other third parties to accomplish network management.

For a variety of reasons, the native or vendor-specific models employed by device manufacturers may not be congruent with the external models employed by users to manage those network devices. Accordingly, there is often a need to map between these native data models or vendor-specific models.

What is desired, therefore, are improved systems and methods to accomplish such mapping.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

As discussed, models are employed in the implementation and management of network devices, where those models are defined in a data modeling language to represent those network devices and their associated configured or operational state or administrative actions. In this way, the devices and their attributes may be represented in a consistent and structured manner. These models can thus provide a convenient medium for dynamic device configuration, as well as the validation of the device state through streaming telemetry or other device interrogation methods.

These models are thus used both by providers of network devices and their users to configure or monitor network devices. Providers of these network devices may utilize the data models to implement internal operations of the network devices while external (e.g., to a network device) data models allow users to manage those network devices. The native models employed by device manufacturers may, however, not be identical, or even similar, to the external models employed by users to manage those network devices. This situation may result in increased complexity with respect to such network management.

To reduce this complexity, a recent trend has been to employ vendor neutral data models to configure and manage networks. These vendor neutral data models define the configuration and operational state of network devices for common network structures, protocols, or services. The use of vendor neutral data models may assist users of network devices (or others tasked with network management) in moving toward a dynamic, programmable method for configuring and managing networks, including those where network devices from multiple vendors may be employed, by allowing network devices to be configured and managed according to a single data model. One example of such a vendor neutral data model is the OpenConfig data model promulgated by the OpenConfig working group.

An ecosystem of open source and third-party proprietary applications or tooling (e.g., network management software) has thus been developed to utilize such external data models (including vendor neutral data models) to configure and manage network devices. Consequently, vendors of network devices provide support for the use of such external data models by providing software, services or other interfaces or functionality (referred to herein collectively as an agent) adapted for such external data models.

In particular, these agents may operate according to a network management protocol through which configuration, operational state, telemetry, or other data (collectively network element data) can be obtained or provided using these external data models. Examples of such network management protocols include the gRPC (Remote Procedure Call) Network Management Interface (gNMI) protocol. gNMI is an open-source protocol used to transfer (e.g., stream) data to and from network devices. For example, gNMI carries data modeled according to OpenConfig, which has some encoding. As such, these agents may accept requests (e.g., commands) and return responses according to a network management protocol (e.g., gNMI) where network element data included in those requests may be specified according to an external data model (e.g., a vendor neutral data model such as OpenConfig).

In many cases, however, vendors of network devices may still employ native data models for use with their network devices and associated operating systems. This is because while vendor neutral data models provide a wide range of feature coverage, there is commonly still a need to model hardware, software, features, configuration, operation, behavior, or other network element data, specific to a vendor's device. This incongruity between native (or internal, used herein interchangeably) data models employed by network devices and the external (e.g., vendor neutral) data models employed in the management of those network devices may be problematic in these circumstances. Specifically, this incongruity may necessitate a mapping or translation of network element data (e.g., the names or cases used for attributes, or prefixes or paths) from a native data model to an external data model (or vice-versa).

In some approaches, this mapping has been done statically. Namely, a configuration for such a mapping is defined and compiled (or otherwise directly incorporated) into the mapping functionality included in that vendor's software. Thus, the mapping between data models is included statically (e.g., in the binary files of) that vendor's software (e.g., an agent or the operating system) on the vendor's network device. This configuration may create a significant problem, as it provides no update path for each mapping without an update directly to that vendor's software. Any change to the data models or the data modeled may thus cause a need for the mapping to be reconfigured, where the only avenue to accomplish this reconfiguration is to update the vendor's software (e.g., the binaries themselves).

What is desired then, is to accomplish the mapping between the (e.g., native and external) data models in a manner which is efficient and can easily be updated or otherwise reconfigured. To address these desires, among others, embodiments as disclosed employ the dynamic mapping of network element data from one data model to another data model. While embodiments may usefully facilitate this mapping of network element data from a native data model to an external data model (e.g., a vendor neutral data model such as OpenConfig or the like), it will be understood more generally that embodiments may be utilized to accomplish this dynamic mapping substantially regardless of the data models utilized.

To illustrate in more detail, markup language or other identifiers or tokens (collectively referred to herein as markup) may be utilized in a definition of a (native) data model that is utilized by a network device, where this markup may define a mapping between an element of that native data model and a corresponding element of the external data model. Such a mapping may specify that (or how) the element of the native data model should be renamed or that a prefix of the element should be altered. The definition of the native data model can be specified, for example, in an (e.g., proprietary) internal modeling language utilized by the providers of the network device or in another modeling language. When the definition of this native data model is processed, such as when the definition of the native data model is processed to create a representation of that native data model in a particular modeling language (e.g., YANG or the like), this markup may be identified and utilized to generate a mapping schema file. According to embodiments, this mapping schema file may be a text based file that defines mappings between elements of the native data model and corresponding elements of the external data model.

Thus, when a request associated with network element data according to the external data model is received, the requested network element data can be obtained from a data source where that requested network element data resides. This network element data can thus be obtained according to the native data model from the data source where the network element data resides. A response to the request can then be formed, wherein the formation of the response involves dynamically mapping the obtained network element data from the native data model to the external data model based on the mapping schema file generated from the definition of the native data model. This response including the network element data according to the external data model can then be sent to the requesting client.

As may be understood, different protocols may be used to transport the network element data (e.g., in the requests and responses). For example, network element data structured according to the OpenConfig data model may be streamed using the gNMI protocol. Other protocols that may be utilized include, for example RESTCONF or NETCONF. Accordingly, the dynamic mapping of network element data using the mapping schema file may occur when a response to the request is formed according to such a transport protocol. For example, the dynamic mapping may occur when serializing the network element data obtained according to the native data model in order to respond to the request using, for instance, the gNMI protocol.

Embodiments may thus have the advantage of allowing network element data to be dynamically translated between data models as responses to requests for network element data (e.g., network management requests) are formed. As an added benefit, this translation process may be based on mapping schema files that may be stored in memory (e.g., as opposed to being incorporated into a binary implementing such a translation process). Accordingly, it may be possible to conform such a mapping process to different models (e.g., native or external) by replacing such a mapping schema file (e.g., without replacing the binary images of any agents or other software involved in the translation process). Moreover, by generating a mapping schema file based on markup included in the definition of a native data model, markup for multiple external data models can be included in a definition for a native data model and used to generate one or more mapping schema files defining the mapping between the defined native data model and the multiple external data models.

Figure 1A:
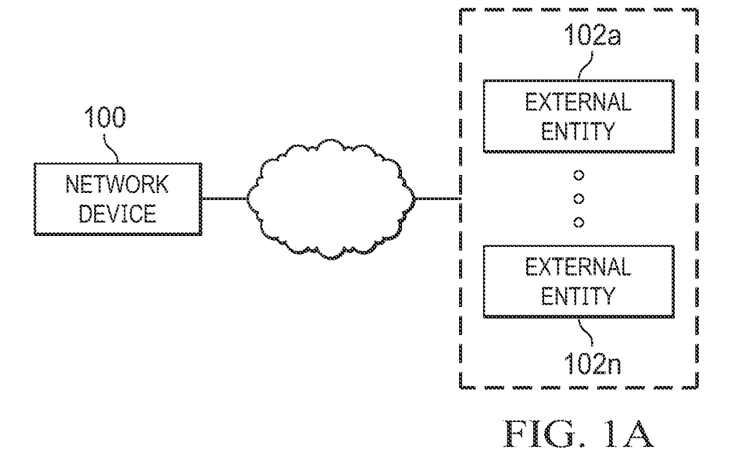
FIG. 1A is a block diagram of a network system including an embodiment of a network device for dynamic data model mapping.

Looking first at FIG. 1A, a computing system including one embodiment of a network device adapted for dynamic mapping of network element data between data models is depicted. The system includes a network device 100 connected to one or more external entities (e.g., 102a, 102n). The network device 100 and the external entities 102 may be directly or indirectly connected to each other using any combination of wired or wireless connections and may communicate using one or more wireless or wired protocols. In embodiments there may be other network devices (or systems) (not shown) that facilitate communication between the devices Network device 100 may include persistent storage, memory (e.g., Random Access Memory), one or more processors (including a switch chip), and network interfaces (ports). Each port may or may not be connected to another device on a network (e.g., a server, a switch, a router, etc.). The switch chip includes hardware for determining how to route packets at the network device 100 (e.g., to which egress port a packet should be routed). The network device 100 may thus be adapted to receive packets via its ports and process the packet to determine whether to drop or route the packet, and to which port the packet should be routed.

How the network device 100 makes the determination of whether to drop the packet, or send the packet to another device on the network may depend, in part, on whether the network element is a layer-2 (L2) switch or a layer-3 (L3) switch (also referred to as a multi-layer switch), which may perform at least some functions of a router. If the network device 100 is operating as a L2 switch, the network element may use a destination Media Access Control (MAC) address along with a forwarding table to determine out of which port to send the packet. If the network device 100 is operating as a L3 switch, the network device 100 may use the destination Internet Protocol (IP) address of a packet along with a routing table to determine out of which port to send the packet, and includes the ability to write the MAC address of the next device to receive the packet in place of its own MAC address (which the last device to send the packet wrote) in the L2 information encapsulating the packet. If the network device 100 is a multi-layer switch, the multi-layer switch includes functionality to process packets using both MAC addresses and IP addresses.

External entity 102 may be, or may execute on, any type of computing system that is configured to interact with the network device 100. For example, the external device 102 may be a desktop computer operated by a network administrator or other type of user. Users at these external network devices 102 may desire to access network element data related to network device 100 or to configure or otherwise manage network device 100 (for ease of description herein the term access network element data, configure and manage will all be utilized interchangeably when used with reference to a network device). To access element data of network device 100 then, a user at the external entity 102 (e.g., an application used by such a user) may send requests to the network device 100. These requests may be specified according to an external data model, such as vendor neutral data model like the OpenConfig data model discussed previously. This external data model may serve as a definition for how network element data is to be structured, formatted or presented. As such, the network device 100 may accept requests and return responses according to a network management protocol (e.g., gNMI) where network element data included in those requests may be specified according to an external data model (e.g., a vendor neutral data model such as OpenConfig).

The network device 100 may, however, employ a native data model for its configuration and other network element data. Thus, network device 100 may be adapted to dynamically map (e.g., data) between a native data model utilized by the network device 100 and an external data model (e.g., a vendor neutral data model) to receive network element data access requests, as well as provide network element data through responses or to perform updates to network element data or network device configurations.

Figure 1B:
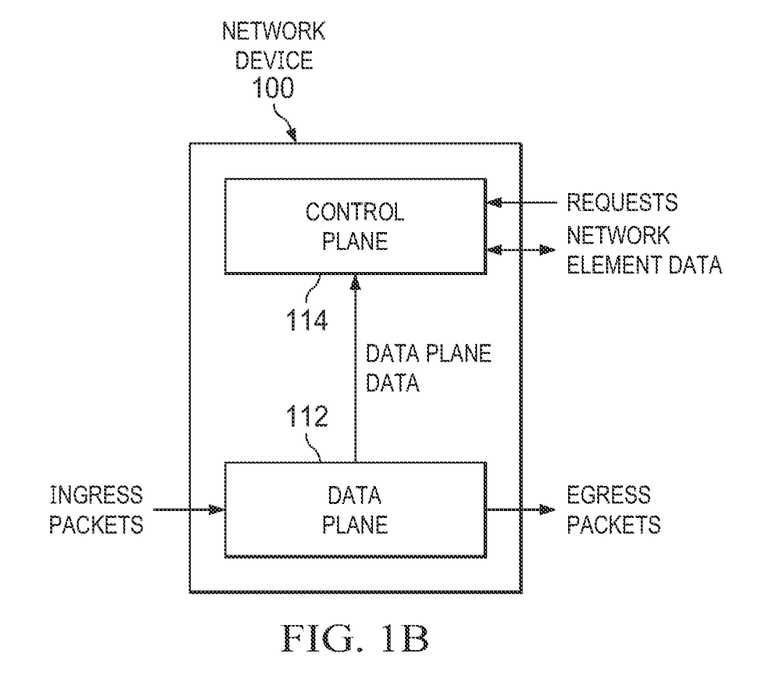
FIG. 1B is a block diagram of an embodiment of a network device for dynamic data model mapping.

Moving now to FIG. 1B, an embodiment of a network device adapted for dynamic mapping of network element data between data models is depicted in more detail. The network device 100 includes a data plane 112 and a control plane 114. The data plane 112 is adapted to receive packets (ingress packets) via ports (not shown) of the network device 100, process the packets and, as appropriate, route packets (egress packets) via the ports. The data plane 112 is also adapted to gather data plane information and to provide this data plane information to the control plane 114. Data plane information includes, for example, network usage data, flow information based on the sampling of packets received by the data plane, information related to queue depths on ingress or egress buffers (not shown) in the data plane, other data traffic statistics or other types of data plane information.

Control plane 114 is adapted to manage the operation of the network device 100 (e.g., at least partially based on the data plane information received from data plane 112). More specifically, the control plane 114 is adapted to manage the operation of the data plane 112. The control plane 114 may also be adapted to receive and respond to network element data requests pertaining to the network device 100. In addition, the control plane 114 may also include functionality to push or receive changes to network element data (e.g., configuration or state) to and from one or more target entities (e.g., external devices, virtual machines or applications executing on external devices, etc.). Control plane 114 is thus adapted to dynamically map (e.g., data) between a native data model utilized by the network device 100 and an external data model (e.g., a vendor neutral data model) to receive these network element data access requests, as well as provide network element data through responses or to perform updates to network element data or network device configurations.

Figure 1C:
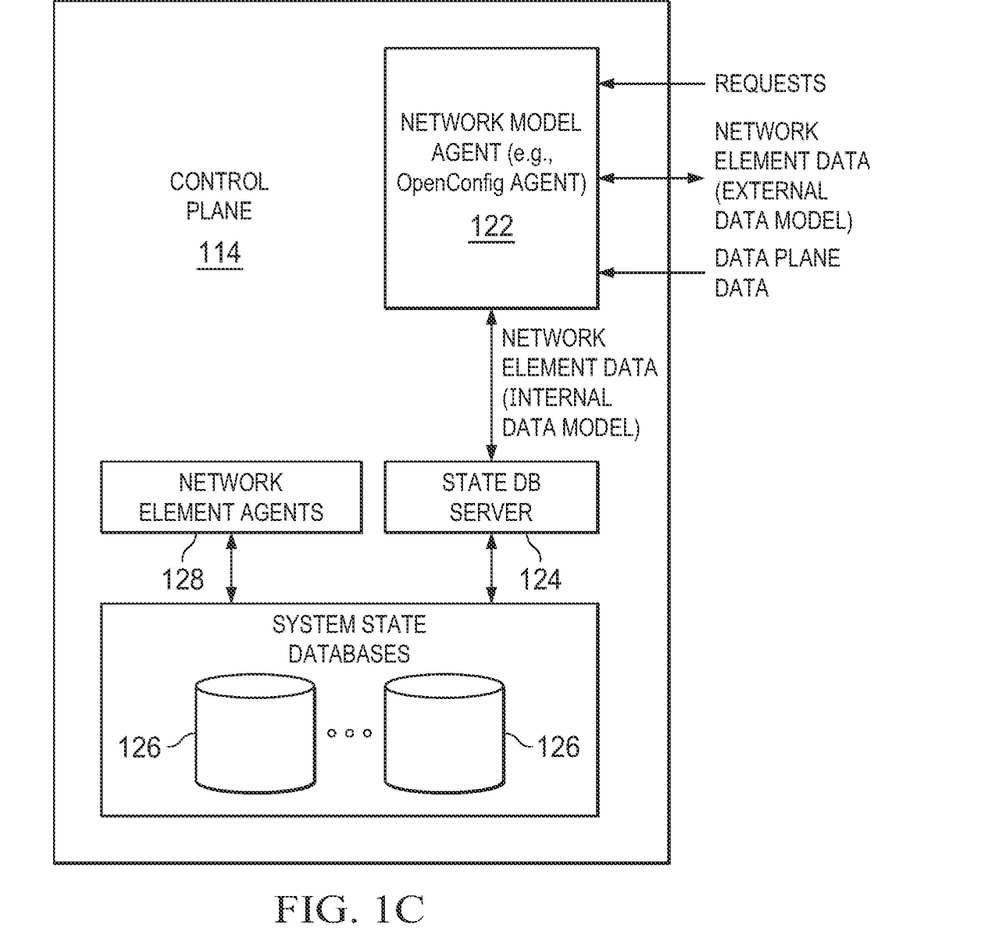
FIG. 1C is a block diagram of a control plane of embodiments of a network device for dynamic data model mapping.

Additional details about such a control plane are described with respect to the embodiment of a control plane of a network device depicted in FIG. 1C. Here, control plane 114 may include a network model agent 122, one or more system state databases 126 and a state database server 124. The control plane 114 may also include one or more network element agents 128 or other functionality to implement protocols, processes, or services of the network device, such as a command line interface agent, a routing information base agent, a forwarding information base agent, a simple network management protocol (SNMP) agent, etc.

System state databases 126 include any single or combination of shared or non-shared data stores (e.g., memories) at one or more locations in network device 100 that store the current state of the network device (e.g., values in data structures used, accessed, stored by, etc. any of the agents or functionality of the control plane 114) such that the system state databases 126 include the values of variables or parameters that are currently specified or configured for the network device (e.g., such as routing table entries or the like). The system state databases 126 store the aforementioned information in records or another data structure within the system state databases 126 where these data structures may conform to a native data model used by network device 100.

These data structures storing network element data of the network device according to a native data model may thus include, for example, all, some, or none, of a name of a variable (or parameter used here internally), the current value of the variable, or a timestamp indicating when the record was created (or last modified) and may be stored at a path associated with the parameter, and may store such network element in accordance with particular paths. Other or different data about the (e.g., current) state of a network element may be stored in system state databases 126 and such data is fully contemplated herein.

A state database server 124 (which may be implemented as an agent) is adapted to access system state databases 126 in order to obtain, provide or modify relevant network element data (e.g., based on a received request or a subscription for such network element data). The state database server 124 may provide such data according to a particular data format or protocol. For example, state database server 124 may provide network element data according to a particular transport protocol such as the gNMI protocol (e.g., may provide such network element data as a gNMI stream). Thus, state database server 124 may provide network element data according to a native data model (e.g., as it is stored in system state databases 126) and according to a particular protocol (e.g., gNMI).

Network model agent 122 may be an agent that may operate according to a network management protocol through which network element data can be obtained or provided using a particular external data model or protocol. For example, network model agent 122 may be adapted to provide data modeled according to a vendor neutral data model such as OpenConfig. As such, network model agent 122 may accept requests (e.g., management requests, commands, etc.) and return responses according to a network management protocol (e.g., gNMI) where network element data included in those requests may be specified according to an external data model (e.g., OpenConfig). It will be noted here, then, that a response may be understood in this context to mean any communication for sending network element data to an external entity, whether in direct response to a request for such network element data, based on an earlier indication (e.g., subscription) that the external entity is interested in such network element data, or based on some other reason for providing the network element data to the external entity.

The network model agent 122 may therefore be adapted to obtain network element data such as the state of a network element, updates to the state of the network element, traffic statistics or other data from a data plane, etc. and provide this obtained network element data to one or more external entities according to the corresponding supported external data model (e.g., OpenConfig). The network model agent 122 may, for example, be adapted to send network element data to one or more external entities anytime there is a change in the state of the network element (e.g., anytime there is a change of any value in a specified element in a system state database 126). Such network element data may be obtained from system state databases 126 through state database server 124. The network model agent 122 may also be adapted to receive network element data from external entities and to write state data, or provide change notifications, to a system state database 126.

Further, the network model agent 122 may be adapted to dynamically map the network element data to be provided to an external entity between the internal data model used to store such data in system state databases 126 and an external data model (e.g., a vendor neutral data model such as OpenConfig or the like) used by external entities to request, receive, or provide such network element data. Thus, when a request associated with network element data according to such external data model is received at the network model agent 122 (or network element data to provide to an external entity is otherwise obtained, such as when subscribed network element data changes or the like), the desired network element data can be obtained from the system state database 126 where that requested network element data resides. In particular, the network element data may be obtained from system state database 126 through state database server 124 such that the network element data received from the state database server 124 is represented according to an internal data model (e.g., as it is stored in system state databases 126) and is received according to a particular protocol (e.g., gNMI).

This network element data to be provided to an external entity can thus be obtained by the network model agent 122 according to the native data model from the system state database 126 where the network element data resides. A response to send the network element data to the external entity can be formed by network model agent 122, wherein the formation of the response involves dynamically mapping the obtained network element data from the native data model to the external data model supported by the network model agent 122.

In one embodiment, the dynamic mapping of the network element data from the native data model to the external data model is done based on a mapping schema file stored in memory in control plane 114. This mapping schema file may, for example, be (e.g., text based file) that defines mappings between elements of the native data model and corresponding elements of the external data model. These mappings may specify, for particular network elements, whether (and how) such an element should be renamed or a prefix of the element changed. The mapping schema file may also indicate a location of the element such as a path of the specific element or where in system state databases 126 such an element is located.

Accordingly, when forming a response including network element data, network model agent 122 may access such a mapping schema file for each network element to be included in the response and (if specified in the mapping schema file) map the data for that network element from the internal data model to the external model for inclusion in the response. As may be understood, different protocols may be used to transport the network element data (e.g., in the requests and responses). For example, network element data structured according to the OpenConfig data model may be streamed using the gNMI protocol. Other protocols that may be utilized include, for example RESTCONF or NETCONF. Accordingly, the dynamic mapping of network element data using the mapping schema file may occur when the response with the network element data is formed according to such a transport protocol. For example, the dynamic mapping from the native data model to the external data model may occur when network model agent 122 is serializing the network element data in order to respond to the request using, for instance, the gNMI protocol.

Figure 1D:
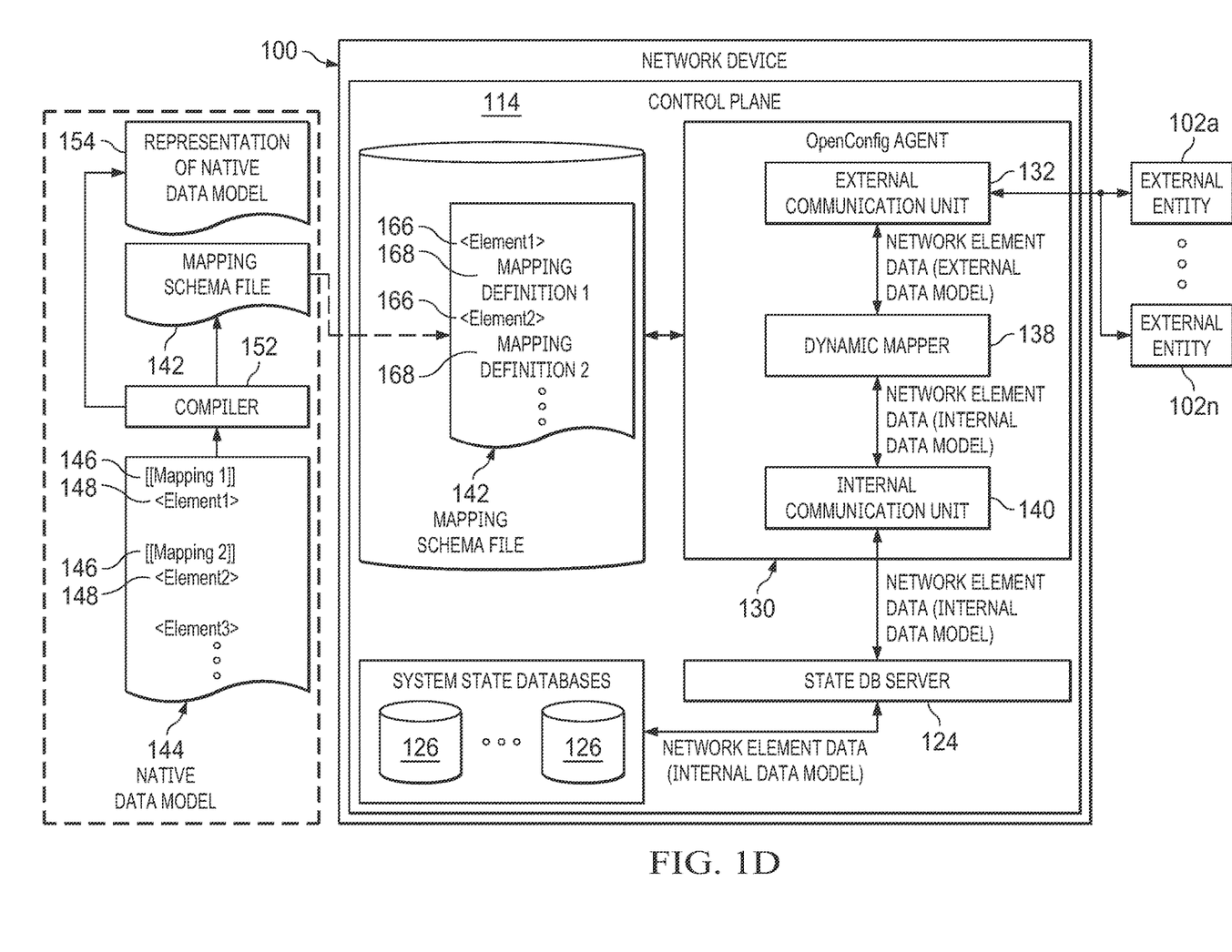
FIG. 1D is a block diagram of a network model agent for an embodiment of a network device for dynamic data model mapping.

FIG. 1D depicts one embodiment of a network model agent adapted to dynamically map network element data between an internal data model used for such network element data and an external data model. While the external data model corresponding to the network model agent may be almost any external data model desired, for ease of description such a network model agent 122 will be described with respect to use of the OpenConfig vendor neutral data model as the external data model without loss of generality. Here, OpenConfig agent 130 may include an external communications unit 132, a dynamic mapper 138 and an internal communications unit 140.

External communications unit 132 manages sending responses including network element data between the OpenConfig agent 130 and one or more external entities 102. The external communication unit 132 may be adapted to send and receive network element data through a number of supported transport protocols. Examples of transport protocols which the OpenConfig agent 130 may use to communicate with external entities, include but are not limited to: HTTP, HTTPS, HTTP2, SPDY, QUIC, gRPC, gNMI, Thrift Mux, RESTCONF, NETCONF, SOAP, and XMPP. Additionally, the external communication unit 132 may include functionality to serialize (e.g., translate data structures or objects into a stream of bytes) and deserialize (e.g., extract data structures or objects from a stream of bytes) network element data that is to be sent or has been received, respectively. Examples of serialization formats, that which may be supported by the OpenConfig agent 130, include but are not limited to: JSON, XML, ASN.1, Protocol Buffer, Thrift, BSON, BDSN, YAML, "gob" (based on the Go programming language), and Cap'n Proto.

Internal communications unit 140 manages network element data transfer between the system state database 126 and the OpenConfig agent 130. The internal communications unit 140 may also be adapted to update the state of a network element by writing new or updated values into the system state database 126. Accordingly, internal communications unit 140 includes functionality to obtain network element data by reading the current values associated with parameters within the system state database 126. Specifically, internal communication unit 140 may interact with state database server 124 to obtain desired network element data. In particular, the network element data may be obtained from system state database 126 through state database server 124 such that the network element data received from the state database server 124 is represented according to an internal data model (e.g., as it is stored in system state databases 126) and is received according to a particular protocol (e.g., gNMI). This network element data can then be provided to external communications unit 132 for communication to an external entity 102. As but one example, the state database server 124 may send an update message to internal communication unit 140 when network element data of interest is changed in system state database 126. This update message may be sent according to a particular protocol (e.g., a gNMI stream) and include the network element data according to the internal data model.

Dynamic mapper 138 may map (e.g., translate, modify, rewrite, add or remove data, etc.) the network element data according to the internal data model as obtained from system state database 126 to OpenConfig as the network element data is provided from the internal communication unit 140 to the external communication unit 132 for sending to an external entity 102. Specifically, dynamic mapper 138 may utilize a mapping schema file 142 at the control plane 114 that specifies a mapping between network elements in the internal data model to the OpenConfig data model. For example, dynamic mapper 138 may be a pass through mapper that modifies the network element data in the native data model received according to gNMI based on mapping schema file 142 to translate included network element data to the OpenConfig data model (if needed) and thereby create a gNMI message including the network element data in the OpenConfig data model.

Such a mapping may be based on mapping schema file 142 in memory of the control plane 114. This mapping schema file 142 may be a text based file that defines mappings between elements of the native data model and corresponding elements of the external data model. In one embodiment, such a mapping schema file 142 may be loaded or otherwise stored in the memory of the control plane 114 during manufacturing or software loading by a provider of the network device (e.g., prior to the operational use of the network element). The mapping schema file 142 may also be updated during operational use of the network device. Accordingly, it may be possible to conform such a mapping process to different models (e.g., native or external) by replacing such a mapping schema file 142 (e.g., during operation of the network device without replacing the binary images of any agents, including OpenConfig agent 130, or other software involved in the mapping process).

A mapping schema file 142 corresponding to an internal data model and a particular external data model may be generated in almost any manner desired. For example, in one embodiment, a mapping schema file 142 may be generated based on markup included in a definition of native data model 144 to be utilized by a network device. Such a mapping schema file 142 may therefore be generated independently of, and asynchronously to, the manufacturer, configuration or operation of a network device utilizing such a mapping schema file 142. In particular, markup 146 (e.g., including a token or other identifier that may be recognized as specifying a mapping) may be included for an element 148 in the native data model 144 (e.g., when the definition of the native data model 144 is created or updated). The definition of the native data model 144 can be specified, for example, in an (e.g., proprietary) internal modeling language utilized by the providers of the network device or in another modeling language.

The markup 146 included in the definition of the internal data model 144 may define a mapping between the corresponding element of that native data model 144 and a corresponding element of the external data model (e.g., OpenConfig). That mapping may, for example, specify a modification to a network element to conform data for that network element from an internal data model to an external data model. Such a modification may include, for example, a translation to be made between naming conventions of the internal data model and the external data model, whether a particular element should be renamed or dropped to comply with the external data model, if and how a prefix utilized with an element in the internal data model should be altered to conform with the external data model, or other types of mappings between the internal data model and the external data model. The markup 146 may also specify other information such as the location in system state databases 126 of an element.

When the definition of this native data model 144 is processed by a compiler (or other type of code generator) 152, such as when the definition of the native data model 144 is processed to create a representation 154 of that native data model in a particular modeling language (e.g., YANG or the like), this markup 146 may be identified by the compiler 152 when processing the internal data model 144 and utilized by the compiler 152 to generate mapping schema file 142. The markup 146 specified in association with the network element 148 is thus processed by the compiler 152 to create a mapping definition for the corresponding network element 148. Such a mapping schema file 142 may thus include an identifier 166 for one or more network elements and the corresponding mapping definition 168 specifying one or more modifications or other mapping actions to be performed on data for the corresponding network element to translate the data of the network element from an internal data model to an external data model.

This mapping schema file 142 can then be loaded into the memory of the network device, or loaded at a later point. By generating a mapping schema file 142 based on the markup 146 included in the definition of a native data model 144, markup for multiple external data models can be included in a definition for a native data model 144 and used to generate one or more mapping schema files 142 defining the mapping between the defined native data model and the multiple external data models.

The representation 154 of the native data model in a (e.g., standard or vendor-neutral) modeling language (such as YANG) may be published or otherwise provided such that it can be used by external entities 102 when interacting with network model agents (such as OpenConfig agent 130) provided by the network device. For example, such a representation 154 of the native data model may be used as a basis for an external data model such as an OpenConfig YANG model provided in association with an external entity 102.

Figure 2:
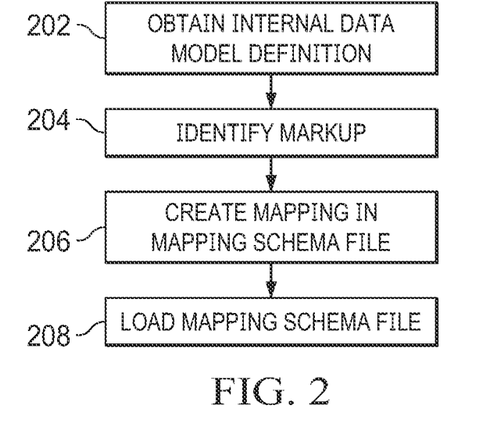
FIG. 2 is a flow diagram of one embodiment of a method for generation of a mapping schema file for use in dynamic mapping of network element data.

FIG. 2 is a flow diagram for a method for providing a mapping schema file to the control plane of a network device for use in mapping network element data from an internal data model to an external data model, such as a vendor neutral data model like OpenConfig. 1n one embodiment, the provisioning process described hereafter occurs during manufacture or initial configuration of a network device (e.g., prior to the operational use of the network element) such as when software or firmware components are installed on the network device. A provisioning process may also occur at various points during the operational use of the network device such as when a native data model or external data model is updated or additional data models are desired to be accommodated.

Initially a definition of the internal data model utilized by a network device that includes mapping markup for one or more elements may be obtained (STEP 202). This definition of the internal data model may be specified in an internal modeling language utilized by the providers of a network device or in another modeling language. Markup (e.g., including a token or other identifier that may be recognized as specifying a mapping) may be included in the definition of the native data model for elements of the data model. The markup included in the definition of the native data model may define a mapping between the corresponding element of that native data model and a corresponding element of an external data model, such as a vendor neutral data model like OpenConfig or the like. That mapping may, for example, specify a translation to be made between naming conventions of the internal data model and the external data model, whether a particular element should be renamed or dropped to comply with the external data model, if and how a prefix utilized with an element in the internal data model should be altered to conform with the external data model, or other types of mappings between the internal data model and the external data model. The markup may also specify other information such as the location in system state databases of an element.

The definition of the internal data model can then be processed to create a mapping schema file from the included markup. According to embodiments, this mapping schema file may be a text based file that defines mappings between elements of the native data model and corresponding elements of the external data model. To create the mapping schema file, the markup for an element may be identified (STEP 204) in the definition of the internal data model and a mapping in the mapping schema file for that element defined based on that markup (STEP 206). In one embodiment, for example, the definition of the internal data model may be provided to a compiler. The compiler may be adapted for converting the representation of the native data model into a data modeling language that may be utilized by external entities or other third parties such as a vendor neutral or open source data modeling language (e.g., YANG). The compiler may also be adapted to identify the markup for a corresponding element (e.g., based on the token or other identifier utilized for the markup) during generation of the representation of the internal data model in the data modeling language, and generate a mapping in the mapping schema file based on that markup to define, in the mapping schema file, how the element is to be mapped from the native data model to the external data model (e.g., OpenConfig).

The mapping schema file created by the compiler can then be loaded on the network device (STEP 208). In particular, the mapping schema file may be loaded or otherwise stored in the memory of the control plane of the network device during manufacturing or software loading by a provider of the network device (e.g., prior to the operational use of the network element). A newly created mapping schema file may also be used to update or supplement an existing mapping schema file on a network device during operation of the network device to allow a mapping process on the network to be utilized with different or additional native of external model without modifying the executable software of the network device.

In some cases, the representation of the internal data model created by the compiler may be utilized as a vendor neutral configuration data model (e.g., an OpenConfig YANG model) that can be provided to a third party or otherwise made available to users of a network device.

Thus, such a model may be utilized as an external data model by external entities to model all or portion of the operation of the network device. For example, the external data model may include all configuration (e.g., values that are set by a network administrator) for a given network protocol or operational data associated with the network device (e.g., data that results from the operation of one or more network protocols). Such an external data model can be provided, for example, by an external entity when accessing the network device (e.g., in association with a request for network element data or the like).

Figure 3:
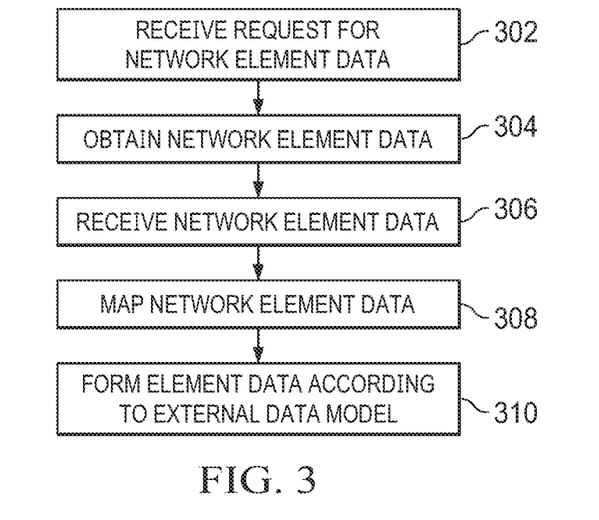
FIG. 3 is a flow diagram of one embodiment of a method for dynamic mapping of network element data in a network device.

Moving now to FIG. 3, a flow diagram for one embodiment of a method for utilizing a mapping schema file by an agent on a network device to dynamically map between a native data model and an external data model is depicted. A request for network element data may be received from an external entity at the network device (STEP 302). For example, an external entity 1) may send a one-time request for such network element data to a model agent (e.g., an OpenConfig Agent) of a network device, 2) may send a subscription request for such network element data to the model agent, or 3) may periodically poll the model agent to obtain network element data. The request may specify the network element data to be obtained and may be associated with an external data model utilized by the external entity. Such a request can be received via a connection using a (e.g., transport or other) protocol supported by the network device and specified or utilized by the external entity to transfer the network element data. The request may also specify or otherwise be associated with a serialization mechanism. For example, an external data model may be an OpenConfig data model and a protocol associated with the request may be the gNMI protocol. Other protocols that may be utilized include, for example RESTCONF or NETCONF.

It will be noted that the external data model, the protocols or serialization mechanism to utilize, or other information associated with the network element data request, may have been determined or otherwise associated with the external entity prior to the reception of the network element data request at the network device. For example, external data models, protocols or serialization mechanisms may have been specified by the external entity in a previous communication with the network device or may have been otherwise configured in association with the external entity at the network device. Thus, in some cases, when the request for network element data is received from an external entity this previously stored information may be associated with the request.

The requested network element data may then be obtained from the system state databases at the network device (STEP 304). In particular, requested network element data may be obtained from the systems state database where the network element data resides according to a native data model employed by the network device. Specifically, according to one embodiment, the requested network element data may specify one or more network elements using an identifier (e.g., for attributes or other parameters) specified by the external data model. A mapping schema file in the memory of the network device may be checked for that network element identifier (e.g., specified according to the external data model) to determine if there is an entry in the mapping schema file corresponding to that identifier. If there is an entry in the mapping schema file corresponding to the identifier for the network element data as utilized in the request (e.g., according to the external data model), it can be determined if the location for that network element in the system state databases is in the mapping schema file or if (and how) the identifier needs to be mapped to a corresponding identifier for the network element as utilized in the native data model. If such a location is specified, the network element may be requested from the specified location. Moreover, the network element may also be requested using an identifier for that network element as defined in the native data model. As another example of obtaining network element data associated with a request, an update message such as a state change notification or the like may be sent to the model agent when requested (e.g., subscribed) network element data, or network element data otherwise associated with the (e.g., OpenConfig) model agent changes in the system state database.

This network element data can then be received from the system state databases (STEP 306). In particular, the network element data may be received from the system state database such that the network element data received is represented according to an internal data model (e.g., as it is stored in system state databases) and is received according to a particular protocol (e.g., a gNMI stream).

The received network element data is then mapped from the internal data model to the external data model (e.g., the OpenConfig data model) utilized by the external entity (STEP 308). The mapping is done according to the mapping schema file in the memory of the network device. During the mapping for the network elements of the network, it can be determined if that network element is specified in the mapping schema file (e.g., using an identifier for the network element specified according to the internal data model). If the mapping schema file includes the network element, any modification or other mapping actions specified for that network element in order to map that network element from the internal data model to the external data model may be performed on the network element data as received from the system state database. This mapping may entail, for example, a translation to be made between naming conventions of the internal data model and the external data model, how a particular element should be renamed to comply with the external data model or if the network element data should be dropped entirely, how a prefix utilized with a network element in the internal data model should be altered to conform with the external data model, or other types of mappings between the internal data model and the external data model. In one embodiment, then, the mapping of the network element data may be performed dynamically by a pass through mapper that modifies the network element data in the native data model received according to gNMI based on the mapping schema file to translate included network element data to the OpenConfig data model and thereby create a gNMI message including the network element data in the OpenConfig external data model. The network element data formed according to the external data model can then be provided to the external entity (STEP 310).

It may now be helpful to an understanding of embodiments to review a non-limiting example. Accordingly, the following is an example of a native data model with markup (specified by the tokens). It will be noted here that certain of the markup (e.g., descriptions such as "unused") may be utilized as mnemonic devices for users (e.g., modelers) of data model representations generated from this native data model in a particular modeling language (e.g., YANG models). For example, these mnemonic markers (e.g., "unused") may be included in the generated data model representation in the modeling language (e.g., the generated YANG model) to inform a user (e.g., a modeler) that the generated modeling language (e.g., the generated YANG) may be replaced by other definitions in that modeling language at some point (e.g., the generated YANG may be replaced at run-time or the like by public YANG associated with the data model).

```
[[yang::version="0.0.1", yang::revision_date="2022-08-25",
    yang::publish="covered-by:openconfig-platform.yang,
        openconfig-platform-linecard.yang",
    yang::description="Platform utilization"]];
    [[yang::description="unused"]]
    struct UtilizationKey {
    [[yang::description="unused"]]
    string kind;
    [[yang::rename="cname",                              yang::
        description="unused"]]
    string componentName;
    [[yang::rename="rname",                              yang::
        description="unused"]]
    string resourceName;
    }
[[yang::description="unused"]]
struct UtilizationEntry: NamedEntity {
[[yang::description="unused"]]
UtilizationKey key;
[[yang::description="unused"]]
u64 used;
[[yang::description="unused"]]
u64 free;
[[yang::description="unused"]]
u64 committed;
[[yang::description="unused"]]
u64 maxLimit;
[[yang::description="unused"]]
u64 highWaterMark;
[[yang::description="unused"]]
seconds lastHighWaterMark;
}
[[yang::path=
    "/components/component[name=c)/ocname]/integrated-
        circuit/utilization/resources/resource[name=% rname]/
        state",
    eos::path=
"DataStores/hardware/capacity/status/rawUtilization[com-
ponentName=% cname][resourceName=% rname]",
    yang::description=" "]]
struct UtilizationStatus: NamedEntity {
```

```
[[yang::description="unused", yang::rename="utilization"]]
UtilizationEntry[key] rawUtilizations;
}
```

Below is an example of a data model representation of the native data model in YANG. Such a representation may, for example, be utilized as a basis for an external data model for requesting network element data, as discussed.

```
module arista-tmp-compiler-explorer-compiler2022726-177-
6w1guv.5l3er-example {
  yang-version 1;
  namespace "http://arista.com/yang/experimental/eos/arista-
tmp-compiler-explorer-compiler2022726-177-6w1guv.5l3er-example";
  prefix "arista-tmp-compiler-explorer-compiler2022726-177-
6w1guv.5l3er-example";
  import openconfig-extensions { prefix "oc-ext"; }
  organization
    "Arista Networks <http://arista.com/>";
  contact
    "Arista Networks <http://arista.com/>";
  description
    "Platform utilization
     THIS YANG MODULE WAS GENERATED. DO NOT
     EDIT THIS FILE.";
  oc-ext:openconfig-version "0.0.1";
  revision "2022-08-25" {
    description
      "Version 0.0.1, generated on 2022-08-25";
    reference "0.0.1";
  }
  grouping utilization-key {
    leaf kind {
      type string;
      description
        "unused";
    }
    leaf cname {
      type string;
      description
        "unused";
    }
    leaf rname {
      type string;
      description
        "unused";
    }
    description
      "unused";
  }
  grouping utilization-entry {
    container key {
      uses utilization-key;
      description
        "unused";
    }
    leaf used {
      type uint64;
      description
        "unused";
    }
    leaf free {
      type uint64;
      description
        "unused";
    }
    leaf committed {
      type uint64;
      description
        "unused";
    }
    leaf max-limit {
      type uint64;
      description
        "unused";
    }
    leaf high-water-mark {
      type uint64;
      description
        "unused";
    }
    leaf last-high-water-mark {
      type int64;
      description
        "unused";
    }
    description
      "unused";
  }
  grouping utilization-status {
    list utilization {
      key "key_kind key_cname key_rname";
      leaf key_kind {
        type leafref {
          path ".. /key/kind";
        }
        description
          "unused";
      }
      leaf key_cname {
        type leafref {
          path ".. /key/cname";
        }
        description
          "unused";
      }
      leaf key_rname {
        type leafref {
          path ".. /key/rname";
        }
        description
          "unused";
      }
      uses utilization-entry;
      description
        "unused";
    }
    leaf name {
      type string;
      description
        "name of the grouping";
    }
    description
      "";
  }
  container components {
    list component {
      key "name";
      leaf name {
        type string;
        description
          "name leaf used as key for component list";
      }
      container integrated-circuit {
        container utilization {
          container resources {
            list resource {
              key "name";
              leaf name {
                type string;
                description
                  "name leaf used as key for resource list";
              }
              container state {
                config false;
                uses utilization-entry;
                description
                  "state container";
              }
              description
                "resource list";
            }
            description
              "resources container";
          }
          description
            "utilization container";
        }
```

```
        description
            "integrated-circuit container";
        }
    description
        "component list";
    }
description
    "components container";
    }
}
```

The following is an example of a mapping schema file that may be generated from the internal data model above (e.g., and that may be utilized in mapping network data elements of the internal data model of the above example to an external data model such as an external data model based on the example YANG data model above):

```
{
    "Manifest": {
        "Kind": "TAC Mapping Info",
        "Version": "0.0.0",
        "ContentType": "Mapping-Info",
        "SourceTACModel": "/tmp/compiler-explorer-com-
            piler2022726-177-6w1guv.5l3er/example.tac"
    },
    "Producer": {
        "Name": "EosModelToYangConverter",
        "Version": "0.1"
    },
    "ConsumerArgs": {
        "YangModuleName":      "arista-tmp-compiler-ex-
            plorer-compiler2022726-177-6w1guv.5l3er-ex-
            ample",
        "YangModules": [
            "openconfig-platform.",
            "openconfig-platform-linecard"
        ]
    },
    "Translations": {
        "TypeIdentifiers": {
            "arista-tmp-compiler-explorer-compiler2022726-
                177-6w1guv.5l3er-example": "arista-tmp-com-
                piler-explorer-compiler2022726-177-
                6w1guv.5l3er-example",
            "UtilizationStatus": "utilization-status",
            "UtilizationEntry": "utilization-entry",
            "UtilizationKey": "utilization-key"
        },
        "InstanceIdentifiers": {
            "key_resourceName": "key_rname",
            "kind": "kind",
            "free": "free",
            "used": "used",
            "key": "key",
            "resourceName": "rname",
            "lastHighWaterMark": "last-high-water-mark",
            "key_kind": "key_kind",
            "maxLimit": "max-limit",
            "committed": "committed",
            "utilization": "utilization",
            "componentName": "cname",
            "highWaterMark": "high-water-mark",
            "key_componentName": "key_cname"
        },
        "Enums": { }
    },
    "PathsAndTypes": [
        {
            "EosTypeName": "UtilizationStatus",
            "EosSubpath":
        "utilization[key_componentName=%/cname]
            [key_resourceName=%rname]",
            "EosPath": "DataStores/hardware/capacity/status",
            "YangPath":      "/components/component[name=%/
                cname]/integrated-circuit/utilization/resources/re-
                source[name=%rname]/state"
        }
    ]
}
```

This example below depicts a mutation of a notification. The input notification has paths with prefix, element, and key names that are in the data model namespace. The output notification has been mutated so that the prefix, element and key names are in the YANG model namespace. Note that in some cases no mutation was needed because the identifiers already matched up. Not shown in this example is the mutation of values, which primarily concerns mapping of enumerators (i.e., sets of labels) from the datastore namespace to the YANG namespace.

An incoming notification may be as follows:

```
notification: <
timestamp: 782319732
prefix: <
elem: <
    name: "DataStores"
    >
elem: <
    name: "hardware"
    >
elem: <
    name: "capacity"
    >
elem: <
    name: "status"
    >
elem: <
    name: "rawUtilization"
    key: <
        key: "componentName"
        value: "chip0"
    >
    key: <
        key: "resourceName"
        value: "Bfn0"
    >
>
elem: <
    name: "c"
    >
>
update: <
    path: <
        elem: <
            name: "committed"
        >
    >
    value: <
        val: <
            int_val: 54376
        >
    >
>
update: <
```

```
path: <
   elem: <
      name: "free"
   >
>
>
>
val: <
int_val: 10042
>
```

The above example incoming notification (i.e., including network element data) may be mapped to the example external data model to form an outgoing notification to an external entity as follows:

```
notification: <
timestamp: 782319732
prefix: <
   elem: <
      name: "components"
   >
   elem: <
      name: "component"
      key: <
         key: "name"
         value: "chip0"
      >
   >
   elem: <
      name: "integrated-circuit"
   >
   elem: <
      name: "utilization"
   >
   elem: <
      name: "resources"
   >
   elem: <
      name: "resource"
      key: <
         key: "name"
         value: "Bfn0"
      >
   >
   elem: <
      name: "state"
   >
>
update: <
path: <
   elem: <
      name: "committed"
   >
>
value: <
   val: <
      int_val: 54376
   >
>
>
update: <
   path: <
      elem: <
         name: "free"
      >
   >
>
   val: <
   int_val: 10042
   >
```

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature, or function, including any such embodiment, feature, or function described. While specific embodiments of, and examples for, the embodiments are described herein for illustrative purposes only, various equivalent modifications are possible within the spirit and scope of the invention, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments of the invention will be employed without a corresponding use of other features, and features described with respect to one embodiment may be combined with features of other embodiments without departing from the scope and spirit of the disclosure as set forth.

What is claimed is:

1. A method for network device management, comprising:
   receiving a request for network element data according to an external data model;
   obtaining a mapping schema file, wherein the mapping schema file defines a mapping between an element of an internal data model and a corresponding element of the external data model, wherein the mapping between the element of the internal data model and the corresponding element of the external data model is specified in a definition of the internal data model and the mapping defined in the mapping schema file was generated from a markup of the element in the internal data model;
   obtaining, in response to the request, the network element data according to the internal data model;
   forming a response to the request by dynamically mapping the obtained network element data from the internal data model to the external data model based on the mapping schema file; and
   sending the formed response in response to the request.

2. The method according to claim 1, wherein the internal data model is defined in a first modeling language and the mapping schema file is generated when processing the internal data model to create a representation of the internal data model in a second modeling language.

3. The method according to claim 1, wherein the dynamic mapping of the network element data occurs during serialization of the network element data from the internal data model to the external data model according to a transport protocol associated with the request.

4. The method according to claim 3, wherein the external data model is a vendor neutral data model.

5. The method according to claim 4, wherein the vendor neutral data model is OpenConfig.

6. The method according to claim 5, wherein the response is formed according to gnome.

7. The method according to claim 1, wherein the mapping indicates that the element of the internal data model should be renamed, that a value for the element of the internal data model should be replaced, that a prefix of the element changed, or a location of the element.

8. The method according to claim 1, further comprising replacing the mapping schema file during operation of a network device.

9. A system, comprising:
a processor;
a memory storing a mapping schema file defining a mapping between elements of an internal data model and corresponding elements of an external data model, wherein the mapping schema file was generated by processing a definition of the internal data model comprising markup specifying the mapping between the elements of the native data model and the corresponding elements of the external data model;
a non-transitory computer readable medium, comprising instructions for a network agent adapted for:
receiving a request for network element data;
obtaining the requested network element data from a data store, wherein the network element data is obtained according to the internal data model;
generating a response to the request including the network element data by forming the network element data according to a first transport protocol, including accessing the mapping schema file to map the elements of the network element data in the internal data model to the corresponding elements in the external data model, and including the corresponding elements in the generated response; and
sending the formed response in reply to the request.

10. The system of claim 9, wherein the data store to access to obtain the requested network element data is determined based on the request for network element data and the mapping schema file.

11. The system of claim 10, wherein the network element data is obtained according to a second transport protocol.

12. The system of claim 11, wherein the first transport protocol and the second transport protocol are the same.

13. The system of claim 12, wherein the first and second transport protocol are gNMI.

14. The system according to claim 9, wherein the internal data model is defined in a first modeling language and the mapping schema file is generated when processing the internal data model in the first modeling language to create a representation of the internal data model in a second modeling language.

15. The system according to claim 14, wherein the second modeling language is YANG.

16. A method for network device management, comprising:
obtaining a definition of an internal data model utilized for network element data at a network device, the definition defined in a first modeling language, wherein the definition of the internal data model includes a plurality of mappings, each mapping comprising markup defining the mapping between an element of the internal data model and a corresponding element of an external data model; and
generating a mapping schema file based on the markup in the definition of the internal data model while processing the definition of the internal data model to generate a representation of the internal data model in a second modeling language, wherein the mapping schema file defines the mapping between an element of the internal data model and the corresponding element of the external data model.

17. The method of claim 16, wherein the mapping schema file is generated by a compiler processing the definition of the internal data model.

18. The method of claim 17, wherein the second modeling language is YANG.

19. The method according to claim 16, wherein the mapping indicates that the element of the internal data model should be renamed, or a prefix of the element changed.

* * * * *